United States Patent [19]

McGee

[11] 4,422,859

[45] Dec. 27, 1983

[54] APPARATUS AND METHOD FOR SAFELY PURIFYING HYDROGEN GAS

[75] Inventor: William R. McGee, Newtown Square, Pa.

[73] Assignee: Consolidated Technology Corporation, West Chester, Pa.

[21] Appl. No.: 381,723

[22] Filed: May 24, 1982

[51] Int. Cl.³ .............................................. B01D 53/22
[52] U.S. Cl. .......................................... 55/16; 55/20; 55/158; 55/217; 55/274
[58] Field of Search ...................... 55/16, 18, 20, 158, 55/212, 217, 274, 314

[56] References Cited

U.S. PATENT DOCUMENTS

| | | | |
|---|---|---|---|
| 1,467,911 | 9/1923 | Arendt et al. | 340/632 |
| 1,751,222 | 3/1930 | Styer et al. | 340/632 |
| 2,088,924 | 8/1937 | Ringrose | 177/311 |
| 2,373,112 | 4/1945 | Francis | 23/254 |
| 2,400,940 | 5/1946 | McCollum | 55/158 X |
| 2,465,377 | 3/1949 | Jaeger | 315/156 |
| 2,499,806 | 3/1950 | Wouk et al. | 177/311 |
| 2,799,851 | 7/1957 | Moore | 340/237 |
| 3,019,853 | 2/1962 | Kohman et al. | 55/16 |
| 3,022,858 | 2/1962 | Tillyer et al. | 183/2 |
| 3,105,442 | 10/1963 | Howerton | 103/11 |
| 3,132,014 | 5/1964 | Wildvank et al. | 55/158 |
| 3,226,915 | 1/1966 | Pinney et al. | 55/158 |
| 3,258,896 | 7/1966 | Muller | 55/16 |
| 3,276,004 | 9/1966 | Mayo, Jr. | 340/237 |
| 3,451,783 | 6/1969 | Collins | 55/16 X |
| 3,559,457 | 2/1971 | Collins | 73/23 |
| 3,624,986 | 12/1971 | Shoemake | 55/158 X |
| 3,641,541 | 2/1972 | Borkhuis | 340/237 R |
| 3,678,513 | 7/1972 | Ward, Jr. | 340/414 |
| 3,699,032 | 10/1972 | Rapp | 55/16 X |
| 3,703,192 | 11/1972 | Staudacher et al. | 55/274 X |
| 3,761,382 | 9/1973 | Hammond et al. | 55/158 X |
| 3,866,460 | 2/1975 | Pearce, Jr. | 73/19 |
| 3,902,485 | 9/1975 | Wallace | 128/142.6 |
| 3,972,695 | 8/1976 | Buckley et al. | 55/158 |
| 4,002,553 | 1/1977 | Arntz | 204/278 |
| 4,003,725 | 1/1977 | Bunn, Jr. et al. | 55/158 |
| 4,030,979 | 6/1977 | Zuber | 195/103.5 M |
| 4,055,075 | 10/1977 | Allan et al. | 73/40.7 |
| 4,069,018 | 1/1978 | Karna et al. | 23/232 E |
| 4,149,161 | 4/1979 | Phillips et al. | 340/632 |
| 4,282,521 | 8/1981 | Lieberman | 340/632 |

Primary Examiner—Robert H. Spitzer
Attorney, Agent, or Firm—Steele, Gould & Fried

[57] ABSTRACT

An apparatus for safely purifying hydrogen gas, comprising: a hydrogen gas diffusion cell for filtering hydrogen gas, the cell having an input for hydrogen gas to be purified, an output for ultrapurified hydrogen gas and an output for waste gas, including hydrogen gas and concentrated corrosive agents; an electrical power supply for heating the diffusion cell to an elevated operating temperature; an electrical circuit for detecting hydrogen gas, disposed adjacent the diffusion cell and the input and outputs, and for generating a command signal when hydrogen is detected; an electrically activatable valve disposed in and controlling the hydrogen gas input, operable in response to the command signal; and, an electrical switch for disabling the electrical power supply in response to the command signal, whereby the apparatus will be rendered completely inoperative before explosive levels of hydrogen gas can accumulate. The apparatus may further comprise an over-temperature sensing switch for disabling the electrical power supply.

A method for preventing explosions in apparatus for purifying hydrogen gas, as described, comprises the steps of: continuously sensing for the presence of hydrogen gas adjacent the diffusion cell and the input and outputs; and, shutting the gas input and disabling the electrical power supply whenever hydrogen gas is detected in a concentration greater than a predetermined amount, preferably ten percent of the lower explosive limit. The method may further comprise the step of disabling the electrical power supply whenever the temperature outside of the gas diffusion cell exceeds a predetermined level.

12 Claims, 2 Drawing Figures

APPARATUS AND METHOD FOR SAFELY PURIFYING HYDROGEN GAS

BACKGROUND OF THE INVENTION

1. Field of the Invention

This invention relates to the field of safety apparatus in hydrogen processing equipment in general, and in particular, to the prevention of explosions in laboratory scale hydrogen gas diffusion purification units.

2. Description of Prior Art

Hydrogen gas is an essential element in many industrial and laboratory processes. Hydrogen must be generated, and in many instances, can only be utilized in extremely pure form. Hydrogen gas is explosive when mixed with air, in concentrations of approximately 40,000 parts per million (ppm) and above.

In the smaller-than-industrial scale of the laboratory, the purification of hydrogen gas is often accomplished by a diffusion cell, wherein dirty or impure hydrogen is passed through a series of silver-palladium tubes at an elevated temperature.

Although hydrogen gas sensors and detectors, in and of themselves, have been known for some time, and although the detection of hydrogen gas has been used in various environments, purification units for hydrogen, as used on a laboratory scale, nevertheless frequently explode. Considering that persons operating such units are expected to exhibit certain levels of proficiency in laboratory skills, such explosions take place with surprising frequency. Such units are often run for long periods of time, and are frequently left unattended.

Hydrogen gas need not leak very long before becoming sufficiently concentrated to become explosive or likely to catch fire. Moreover, diffusion purification units utilize cells operating at temperatures of approximately 750° F., and are incorporated into housings or cabinets. Even a leak from without the unit could be the cause for an explosion. Leaks can be caused by loose fittings, by a brittleness in the tubing caused by the hydrogen gas flow and by the corrosive waste products.

For the very first time, and despite the existence of hydrogen gas detectors of various forms of some time, this invention provides a method and apparatus by means of which hydrogen gas explosions in laboratory scale hydrogen purification units can be virtually eliminated.

SUMMARY OF THE INVENTION

It is an object of this invention to provide a method and apparatus for preventing hydrogen gas explosions in hydrogen gas purification units.

It is another object of this invention to prevent such explosions by detecting the presence of free or leaking hydrogen gas before such gas has an opportunity to accumulate in explosive concentrations.

It is still another object of this invention to disable such purification units and cut off the hydrogen gas input thereto before such explosive concentrations can accumulate.

It is yet another object of this invention to provide such protection against explosion automatically and without personal supervision.

It is yet another object of this invention to prevent such explosions without inhibiting hydrogen gas purification.

These and other objects of this invention are accomplished by an apparatus for safely purifying hydrogen gas, comprising: a hydrogen gas diffusion cell for filtering hydrogen gas, the cell having an input for hydrogen to be purified, an output for ultra purified hydrogen and an output for waste gas, including hydrogen gas and concentrated corrosive agents; an electrical power supply for heating the diffusion cell to an elevated operating temperature; means for detecting hydrogen gas, disposed adjacent the diffusion cell and the inputs and outputs, and for generating a command signal when hydrogen is detected at a predetermined level; and, means for disabling the electrical power supply and for interrupting the hydrogen gas input in response to the command signal. The means for interrupting the hydrogen gas input may comprise an electrically activatable valve disposed in and controlling the input of hydrogen to be purified into the diffusion cell. The apparatus may further comprise an overheat sensing switch for disabling the electrical power supply when temperatures in the vicinity of the diffusion cell exceed a predetermined level.

A method for preventing explosions in such apparatus for purifying hydrogen gas comprises the steps of: continuously sensing for the presence of hydrogen gas immediately adjacent the diffusion cell and the input and outputs; and, disabling the electrical power supply and interrupting the hydrogen gas input whenever a predetermined level of hydrogen gas concentration is detected. The method further comprises the step of disabling the electrical power supply whenever the temperature in the vicinity of the purification cell exceeds a predetermined level.

BRIEF DESCRIPTION OF THE DRAWINGS

For purposes of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
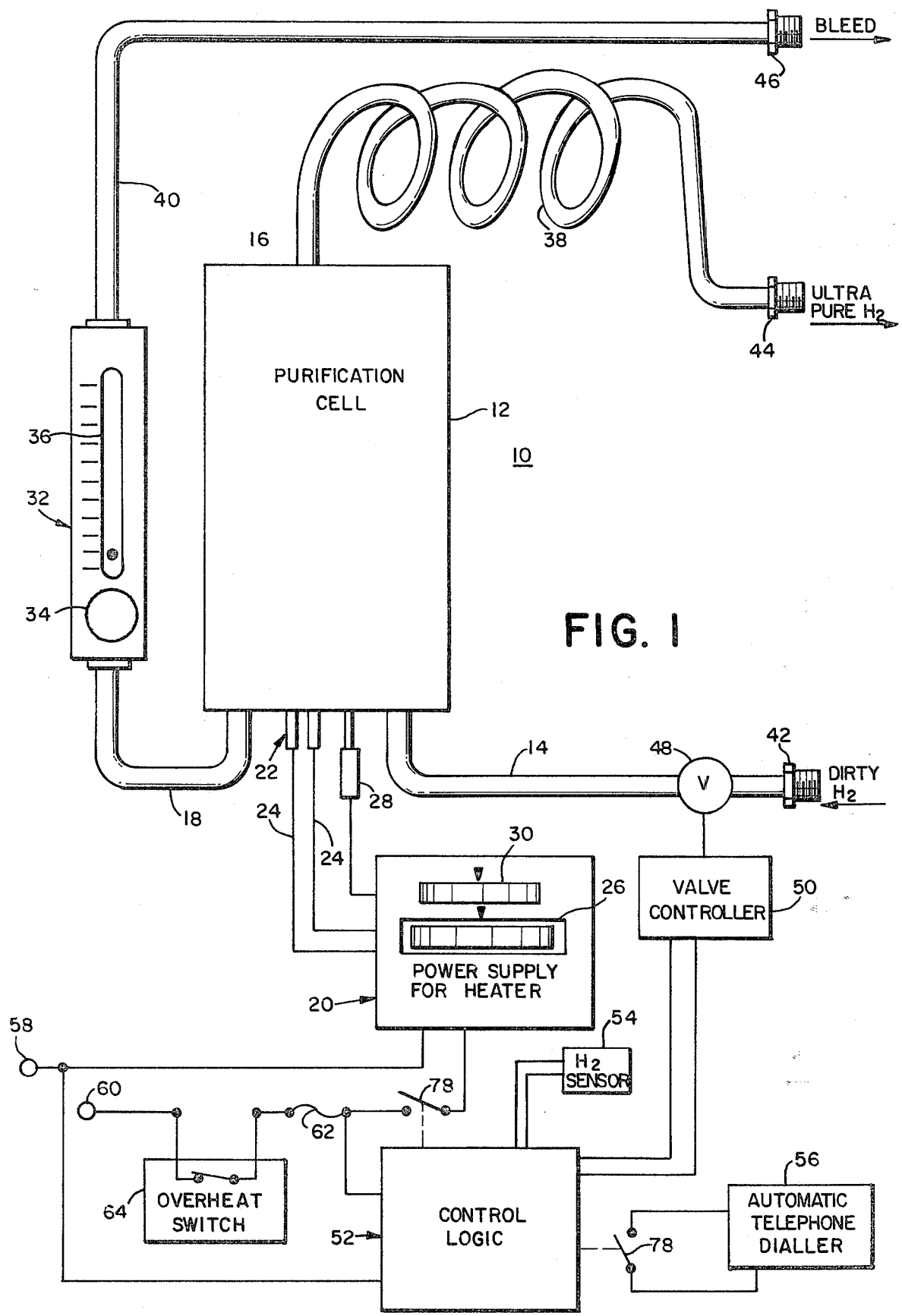
FIG. 1 is a diagramatic illustration of a hydrogen gas purification unit according to this invention; and, FIG. 2 is a circuit diagram of the logic control portion of the purification unit shown in FIG. 1.

A hydrogen gas purification unit according to this invention is illustrated in FIG. 1 and generally designated 10. Purification of the hydrogen gas occurs in the purification diffusion cell 12 having an input line 14 for dirty, contaminated and/or impure hydrogen gas and an output tube 16 for ultra-purified hydrogen gas. Waste or "bleed" gas leaves the purification cell through tube 18.

The diffusion cell operates at an elevated temperature of approximately 750° F. (approximately 400° C.). The diffusion cell is heated by an electrical power supply 20 which powers an electrical resistance heating element 22 disposed inside the diffusion cell 12. The heater 22 is connected in a closed loop to the power supply by wires 24, and the temperature level can be set by dial 26. A thermocouple 28 is also disposed within the diffusion cell and provides feedback. The thermocouple is connected to a temperature scale and monitor 30. The temperature scale monitors the operating temperature of the diffusion cell with respect to the number of degrees above or below the adjusted temperature. A suitable power supply is manufactured by Athena Controls, Inc., Model 2000B.

The waste gas 18 is fed to a bleed control 32. Bleed control 32 has an adjustment knob 34 for controlling the flow rate and a scale 36 for setting the desired level of flow rate. If gas flow through the bleed control 32 is restricted, the amount of hydrogen gas being purified increases. If the flow rate through the bleed control is increased, the amount of hydrogen gas being purified decreases. Operating pressures within the diffusion cell can be as high as 200 pounds per square inch. Although higher operating pressures are desirable for increasing the amounts of hydrogen gas being purified, higher operating pressures increase the danger of operation and increase the "wear-and-tear" on the purification unit.

In view of the high operating temperature of the diffusion cell, the ultra-pure hydrogen gas is cooled in a series of coils 38. The bleed or waste gas leaves the bleed control through the tube 40. The purification apparatus is generally disposed within a housing or cabinet, not shown. Accordingly, swage lock bulkhead fittings 42, 44 and 46 may be provided for the hydrogen gas input, ultra-purified hydrogen gas output and the bleed or waste gas output, respectively.

An electrically activatable valve 48 is disposed in the input line 14 to the diffusion cell 12, between the skin connector 42 and the diffusion cell 12. Valve 48 is operated by a valve controller 50 which may be a solenoid or the like. A suitable controller and valve are manufactured by Automatic Switch Company, under the trademark "ASCO", Catalog No. 8262 C15.

The valve/valve controller 48, 50 and the power supply 20 operate in response to command signals generated by control logic 52. As illustrated in FIG. 1, the control logic 52 has four principal functions, although other arrangements are possible. One function of the control logic 52 is to monitor the output of a hydrogen gas sensor 54. The hydrogen gas sensor 54 is preferably disposed within the cabinet or housing, adjacent the diffusion cell and the input and outputs thereof. The lower explosive limit of hydrogen gas is approximately 40,000 parts per million parts air. The sensor 54 is preferably chosen and adjusted to a sensitivity which will detect concentrations of approximately 10 percent of the lower explosive limit, approximately 4,000 parts per million. A suitable hydrogen sensor is a Figaro Model No. 813. The sensor will detect not only hydrogen gas which may leak from some portion of the apparatus 10, but also any hydrogen gas which may be leaking from a source outside of the apparatus 10.

A second function of the control logic is to operate the valve/valve controller 48, 50. In particular, valve 48 is permitted to stay open as long as the predetermined level of hydrogen gas concentration is not detected by the hydrogen gas sensor 54. If such a concentration level of hydrogen gas is detected, the control logic generates a command signal which closes valve 48.

A third function of the control logic is to disable the power supply 20 for the heater 22, for example by interrupting one of the electrical power inputs to the power supply. The valve can also be controlled indirectly if the power supply has its own power contacts for the valve controller.

Figure 2:
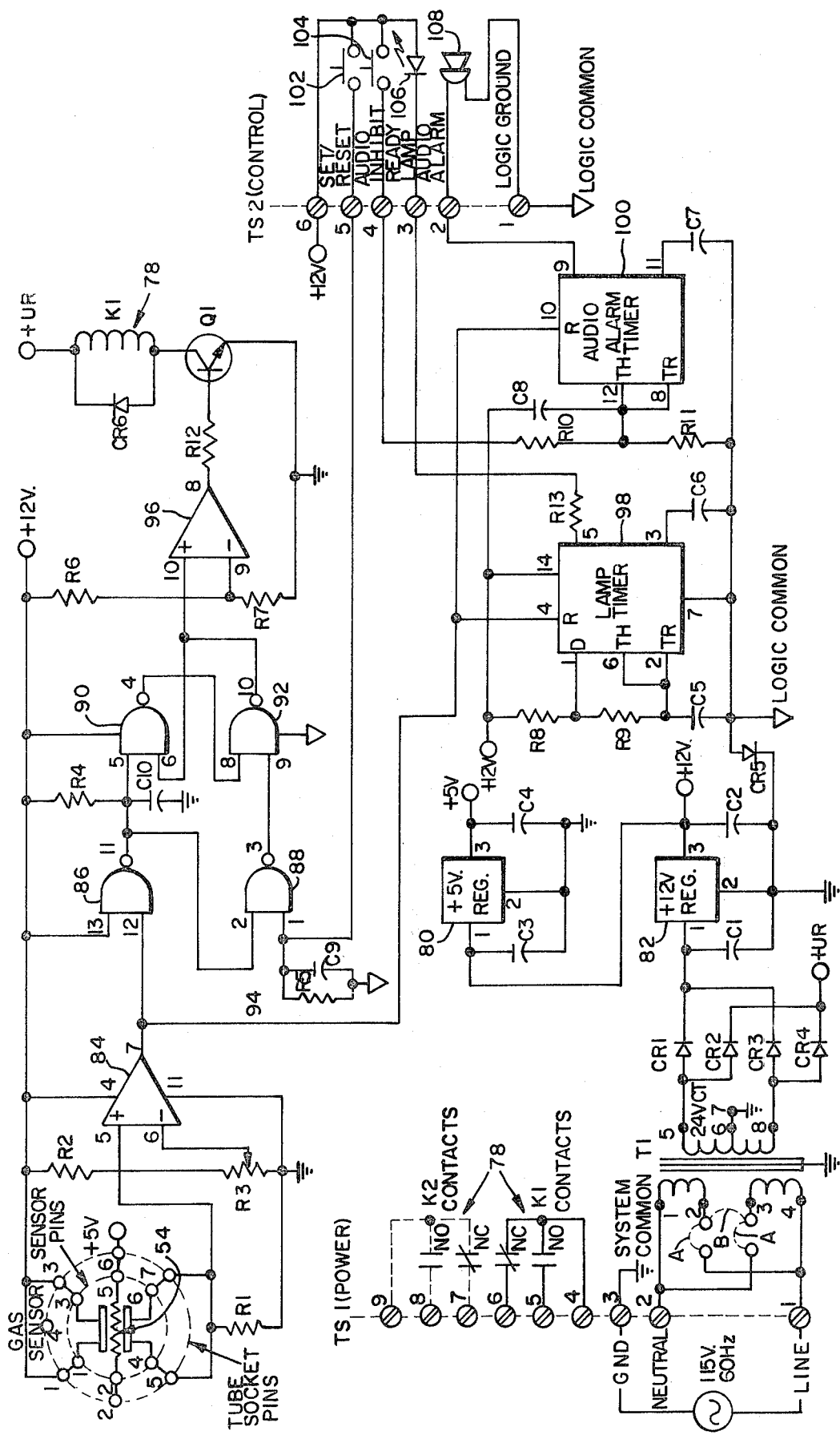

A fourth function is to activate warning alarms. These may be local warning signals, such as an audible alarm or flashing light as illustrated in FIG. 2. Remote alarms may also be included, such as an automatic telephone dialer 56.

Both the power supply 20 and the control logic 52 receive electrical power through electrical mains terminal 58 and 60. Terminal 58 is illustrated as being directly connected. Terminal 60, however, is provided with two additional safety features. One such feature is a fuse 62. The other such feature is an overheat sensing switch 64 which is preferably disposed in the vicinity of the diffusion cell 12. The overheat switch may be chosen and adjusted to interrupt power to both the power supply 20 and control logic 52 if temperatures within the cabinet or housing exceed a temperature in the range of approximately 15% to 20% of the diffusion cell operating temperature, for example in the range of 124° F. to 140° F. A suitable heat sensor is manufactured by Elmwood, Inc., Model No. 2455 RM 2.

The switching functions performed by the control logic 52 may be conveniently effected by several sets of relay contacts, as illustrated more fully in FIG. 2. It is presently preferred that the overheat sensing switch 64 operate independently of the control logic, in order to assure that the purification unit will be disabled in the event that overheating occurs in the control logic. The fact that the overheat sensing switch is set at a level significantly below the operating temperature of the diffusion cell is at least in part related to the fact that when such purification units are disposed within cabinets or housings, ventilating fans are provided which lower the ambient normal temperature within the housing.

The control logic 52 is fully illustrated in FIG. 2. Inasmuch as the illustrated pin numbers provide a complete wiring diagram, each and every connection between the various components need not be described or identified in detail. Operation of the control logic can be fully understood from the various functional components thereof. A power supply for the control logic comprises a transformer T1 and a rectifying circuit including four diodes CR1, CR2, CR3 and CR4. Transformer T1 and the rectifying circuit will convert electrical mains power to 24 volt direct current. If the jumper wires designated A are utilized, the transformer will be adapted for use with 115 volt alternating current input, which is of course supplied at 60 Hz. If instead jumper wire B current input, which is supplied at 50 Hz. One output of the rectifying circuit provides an unregulated voltage for operating the coil K1 of relay 78. The other output of the rectifying circuit provides an input to a 12 volt regulator 82 which powers all of the integrated circuits in the contol logic. The output of the 12 volt regulator 82 also provides an input for a 5 volt regulator 80. The 5 volt regulator 80 provides an additional power input for the hydrogen gas sensor 54.

The output of the hydrogen gas sensor 54 is amplified by operational amplifier 84. Operational amplifier 84 is one of two circuits in part number LM324, a dual OP-amp. The sensitivity of the hydrogen gas sensor and the operational amplifier can be adjusted by variable resistor R3. The output of operational amplifier 84 disables a lamp timer 98 and audio alarm timer 100 in the absence of hydrogen gas being detected.

NAND gates 90 and 92 are cross-coupled to form a latch or flip/flop which is set and reset depending upon whether or not hydrogen gas is detected. A set/reset button 102 provides one input to the flip/flop. An RC circuit 94 reduces switch bounce from operation of set/reset button 102. In order to prevent dangerously setting or resetting the flip/flop when hydrogen gas is detected in dangerous concentration levels, the signal from the set/reset button is gated through NAND gate 88, which through NAND gate 86, can be disabled by the output of operational amplifier 84. The output of NAND gate 86 provides the other input to drive the flip/flop.

When hydrogen gas is detected, and the flip/flop changes accordingly, this condition is amplified in operational amplifier 96 which turns on transistor Q1, which in turn energizers coil K1 of relay 78 and enables the various protective functions of the control logic to proceed. Operational amplifier 96 is another portion of integrated circuit part number LM324. NAND gates 86, 88, 90 and 92 are preferably all part of CMOS integrated circuit part number 4011B. The transistor Q1 is part number 2N4401. The identification of the various part numbers are substantially standard, although some variation may occur between manufacturers.

When hydrogen gas is detected, and the control functions are enabled, lamp timer 98 enables operation of a blinking warning light 106, which may be a light emitting diode. At the same time, audio alarm timer 100 enables operation of an audible alarm 108. Timers 98 and 100 are part of integrated circuit part number 556.

In order to prevent activation of the purification unit in the presence of explosive levels of hydrogen gas, the control logic provides a built in delay of between two and three minutes during which the control logic "assumes" that such explosive levels of hydrogen are present. If no hydrogen gas is detected by the hydrogen gas sensor within the start-up period, operation of the purification unit may be initiated by activation of the set/reset button. The delay is provided by the time constant of the RC circuit including capacitor C8 and resistor R11.

Power into and out of the control logic is routed through terminal strip 1, designated TS1 in FIG. 2. The control functions are routed through terminal strip 2, designated TS2 in FIG. 2.

In the presently preferred embodiment, as illustrated in FIG. 2, the values and identification of the various components are as listed below. It may be noted that the logic ground or common and the system ground or common are isolated from one another by means of diode CR5. It will be appreciated by those skilled in the art that the circuit may be formulated in a number of ways which would enable the various control functions of the control logic to be activated through sets of relay contacts, or directly through transistor switches.

TABLE 1

| Resistor Values in Ohms | | | |
|---|---|---|---|
| R1 | 3.9 K | R7 | 4.7 K |
| R2 | 1 K | R8 | 10 K |
| R3 | 5 K (Variable) | R9 | 10 K |
| R4 | 10 K | R10 | 51 |
| R5 | 4.7 K | R11 | 1 M |
| R6 | 10 K | R12 | 4.7 K |

TABLE 2

| Diode Part Numbers | | | |
|---|---|---|---|
| CR1 | IN 4001 | CR4 | IN 4001 |
| CR2 | IN 4001 | CR5 | IN 4001 |
| CR3 | IN 4001 | CR6 | IN 4001 |

TABLE 3

| 10 Capacitor Values in $\mu f$ | | | |
|---|---|---|---|
| C1 | 1,000 | C6 | .01 |
| C2 | .01 | C7 | .01 |

TABLE 3-continued

| 10 Capacitor Values in $\mu f$ | | | |
|---|---|---|---|
| C3 | 47 | C8 | 220 |
| C4 | .01 | C9 | 0.1 |
| C5 | 22 | C10 | 0.1 |

This invention may be embodied in other specific forms without departing from the spirit or essential attributes thereof, and accordingly, reference should be made to the appended claims, rather than to the foregoing specification, as indicating the scope of the invention.

I claim:

1. A method for preventing explosions in hydrogen gas diffusion purification units, each of the units having a hydrogen gas diffusion cell with an input for hydrogen gas to be purified, an electrical power supply for heating the diffusion cell to an operating temperature, a temperature sensor disposed within the diffusion cell and connected to the electrical power supply, an output for ultra-purified hydrogen and an output for waste gas the method comprising the steps of:

continuously sensing for the presence of hydrogen gas, at a predetermined level of concentration, outside and adjacent the diffusion cell, the gas input and the gas outputs;

electronically monitoring the continuous sensing for the presence of hydrogen gas;

continuously, and independently of the hydrogen gas presence monitoring, sensing the temperature outside and adjacent the diffusion cell and the continuous monitoring;

disabling only the electrical power supply for the diffusion cell and interrupting the input of hydrogen gas to be purified whenever hydrogen gas is detected at the predetermined level; and, disabling the electrical power supply to the entire unit whenever a predetermined temperature level is detected, the hydrogen gas flow through the diffusion units being interrupted.

2. The method of claim 1, wherein the predetermined level of hydrogen gas concentration is approximately 10% of the lower explosive limit thereof; and, wherein the predetermined temperature level is in the range of approximately 15% to 20% of the diffusion cell operating temperature.

3. The method of claim 1, further comprising the step of activating local and remote warning alarms when the predetermined level of hydrogen gas concentration is detected.

4. The method of claim 3, further comprising the steps of:

sounding an audible alarm;
flashing a light; and,
activating an automatic telephone dialing unit.

5. The method of claim 1, further comprising the steps of:

generating a command signal whenever hydrogen gas is detected at the predetermined level of concentration;

disposing an electrically activatable valve in the input for hydrogen gas to be purified; and, operating the valve in response to the command signal.

6. An apparatus for safely purifying hydrogen gas, comprising:

a hydrogen gas diffusion cell for filtering hydrogen gas, the cell having an input for hydrogen to be purified, electrical heating means, an output for ultra-purified hydrogen and an output for waste gas, including hydrogen gas mixed with concentrated corrosive agents;

an electrical power supply for heating the diffusion cell to an operating temperature;

a temperature sensor disposed within the diffusion cell for detecting the temperature therein;

means for detecting hydrogen gas, disposed outside of the diffusion cell but adjacent the input and outputs thereof;

a control circuit, connected to the means for detecting the hydrogen gas, for generating a command signal when hydrogen is detected at a level of concentration exceeding a predetermined amount;

means for disabling the electrical power supply and for interrupting the hydrogen gas input in response to the command signal, whereby explosive concentrations of hydrogen gas are avoided; and, an independently operable ambient temperature overheat sensing switch disposed adjacent the diffusion cell and the control circuit for interrupting electrical power thereto when ambient temperatures exceed a predetermined level, whereby explosive temperatures due to overheating of either one of the diffusion cell and the control circuit are avoided and the hydrogen gas flow through the diffusion cell in interrupted.

7. The apparatus of claim 6, further comprising an electrically activatable valve disposed in and controlling the input for hydrogen gas to be purified, the valve being operable in response to the command signal.

8. The apparatus of claims 6 or 7, wherein the command signal is generated whenever hydrogen is detected in a concentration of approximately 10% of the lower explosive limit thereof.

9. The apparatus of claims 6 or 7, wherein the heat sensing switch interrupts the power at a temperature in the range of approximately 15% to 20% of the gas diffusion cell operating temperature.

10. The apparatus of claims 6 or 7, further comprising local and remote warning alarms operable in response to the command signal.

11. The apparatus of claim 10, wherein the local warning alarms include an audible alarm and a flashing light.

12. The apparatus of claim 10, wherein the remote warning alarms include an automatic telephone dialing unit.

* * * * *

UNITED STATES PATENT OFFICE
CERTIFICATE OF CORRECTION

PATENT NO. : 4,422,859
DATED : December 27, 1983
INVENTOR(S) : William McGee

It is certified that error appears in the above-identified patent and that said Letters Patent are hereby corrected as shown below:

In column 8, line 10, --gas-- should be inserted after the word hydrogen.

Signed and Sealed this

Twenty-third Day of October 1984

[SEAL]

Attest:

GERALD J. MOSSINGHOFF

Attesting Officer    Commissioner of Patents and Trademarks